(12) United States Patent
Martin et al.

(10) Patent No.: US 8,080,762 B2
(45) Date of Patent: Dec. 20, 2011

(54) ELECTRIC ARC WELDING MACHINE WITH CONTROL INTERFACE

(75) Inventors: Alberto Martin, Sarcedo (IT); Mark Lowther, Lowton Warrington (GB)

(73) Assignee: ITW Welding Products Italy S.R.L., San Giuliano Milanese (IT)

( * ) Notice: Subject to any disclaimer, the term of this patent is extended or adjusted under 35 U.S.C. 154(b) by 947 days.

(21) Appl. No.: 11/214,022

(22) Filed: Aug. 30, 2005

(65) Prior Publication Data

US 2006/0043082 A1 Mar. 2, 2006

(30) Foreign Application Priority Data

Aug. 31, 2004 (IT) ............................... TO2004A0580

(51) Int. Cl.
*B23K 9/10* (2006.01)
(52) U.S. Cl. ................. 219/130.5; 219/130.1; 219/137.9
(58) Field of Classification Search ............... 219/130.1, 219/130.5, 136, 137.9
See application file for complete search history.

(56) References Cited

U.S. PATENT DOCUMENTS

| | | | | |
|---|---|---|---|---|
| 2,838,654 A * | 6/1958 | Nugent | ....................... | 219/137.9 |
| 3,665,147 A * | 5/1972 | Schobel et al. | ............ | 219/130.1 |
| 4,371,318 A | 2/1983 | Kime | | |
| 4,717,805 A * | 1/1988 | Miyagawa | .................... | 219/108 |
| 4,721,947 A | 1/1988 | Brown | | |
| 4,942,281 A * | 7/1990 | Srba | ................................ | 219/75 |
| 5,189,277 A * | 2/1993 | Boisvert et al. | ........... | 219/121.54 |
| 5,208,436 A * | 5/1993 | Blankenship | ............ | 219/121.54 |
| 5,311,440 A * | 5/1994 | Hess, Jr. | ........................ | 324/615 |
| 6,075,224 A * | 6/2000 | De Coster | .................. | 219/130.4 |
| 6,596,972 B1 * | 7/2003 | Di Novo et al. | ........... | 219/137.9 |
| 6,758,423 B1 * | 7/2004 | Perkins et al. | ................ | 239/690 |
| 7,084,371 B2 * | 8/2006 | Hett et al. | .................. | 219/130.5 |
| 7,289,878 B1 * | 10/2007 | Estelle et al. | ................. | 700/233 |
| 7,381,925 B2 | 6/2008 | DeCoster et al. | | |
| 2003/0016001 A1 * | 1/2003 | Borup | .......................... | 323/364 |
| 2004/0104209 A1 | 6/2004 | Bankstahl et al. | | |
| 2005/0069028 A1 * | 3/2005 | Belge et al. | ..................... | 375/222 |
| 2005/0258155 A1 * | 11/2005 | DeYoung | .................. | 219/130.1 |
| 2010/0314371 A1 * | 12/2010 | Davidson et al. | .......... | 219/130.1 |

FOREIGN PATENT DOCUMENTS

FR 2 836 641 9/2003
WO WO 0044523 A1 * 8/2000

* cited by examiner

*Primary Examiner* — Mark Paschall
(74) *Attorney, Agent, or Firm* — Lowe Hauptman Ham & Berner LLP

(57) ABSTRACT

An electric arc welding machine includes a manual welding tool, an electric power unit, and a cable electrically connecting the welding tool and the electric power unit. The electric power unit includes an electric power converter, an electronic central control unit, and a control panel that allows the user to manually set a desired operating mode and operating specifications based upon equipment selected from a memory module. The electronic central control unit provides real-time control over electric power supplied to the welding tool in accordance with the manually set operating mode and selected equipment.

3 Claims, 1 Drawing Sheet

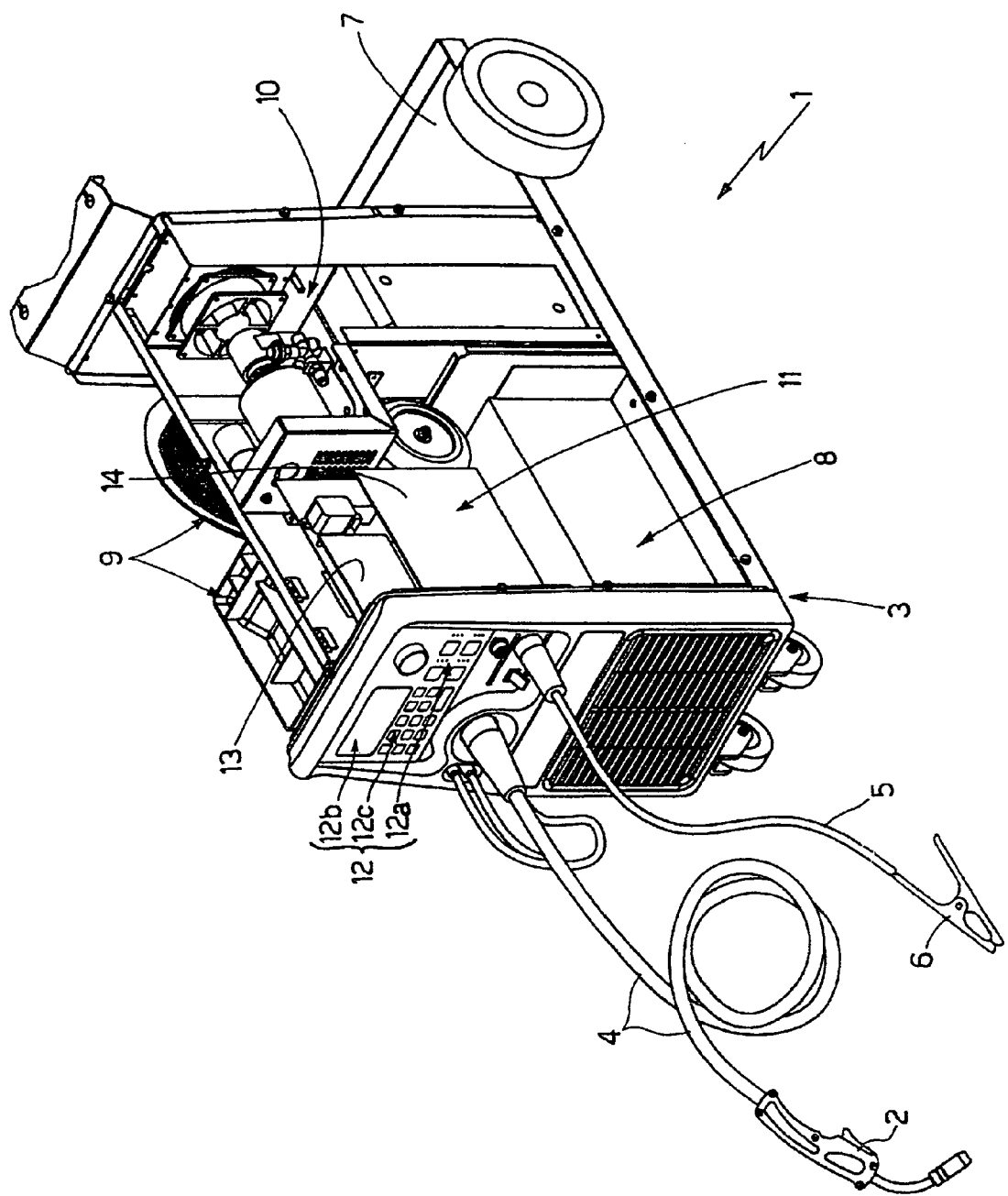

ELECTRIC ARC WELDING MACHINE WITH CONTROL INTERFACE

RELATED APPLICATIONS

The present application is based on, and claims priority from, Italian Application Number TO2004A 000580, filed Aug. 31, 2004, the disclosure of which is hereby incorporated by reference herein in its entirety.

FIELD OF THE INVENTION

The present invention relates to an electric arc welding machine.

More specifically, the present invention relates to a compact, portable electric arc welding machine, to which the following description refers purely by way of example.

BACKGROUND OF THE INVENTION

As is known, currently marketed compact, portable electric arc welding machines are normally designed for MIG (Metal Inert Gas), MAG (Metal Active Gas), TIG (Tungsten Inert Gas), STICK or MMA (Metal Manual Arc) welding or any combination of these, and comprise a torch or welding gun designed for manual manipulation by the operator for manual welding, and an electric power unit connected electrically to the torch or gun by a connecting cable to supply the torch or gun with electric welding power with real-time control of voltage and current supply. The electric power unit is also designed to supply the torch or gun over the same connecting cable with the inert gas and metal filler wire used in some of the welding processes mentioned above.

More specifically, the electric power unit of welding machines of the above type substantially comprises an electric power converter, which draws electrical energy from the mains and converts it to electrical energy suitable for supply to the torch or gun, i.e. electrical energy with voltage and current values varying in real time as a function of demand by the welding process being performed; and a wire-feed device for supplying the torch, along the connecting cable, with a metal wire for MIG or MAG welding. The electric power unit of arc welding machines of the type in question also comprises a cooling unit for circulating coolant through the whole of the connecting cable and the torch to remove surplus heat produced in the cable and torch and so keep the torch and the connecting cable below a predetermined maximum temperature; and possibly also a pressurized-gas tank, with regulating valves, for storing the inert-gas mixture for supply, when needed and again along the connecting cable, to a diffuser integrated in the torch.

In compact, portable electric arc welding machines, the electric power converter, the wire-feed device, the cooling unit, and, in some cases, also the inert-gas tank and relative regulating valves, are fixed to a single supporting frame with wheels on which it rests on the floor, so that the electric power unit as a whole can be moved easily from one workplace to another.

Needless to say, the electric power unit, the torch or gun, the relative connecting cable, and the work grounding cable are designed to permit continuous operation of the machine at maximum power output.

In other words, the component parts of the electric power converter, the torch or gun, and the sections of the grounding cable and the electric cables integrated in the cable connecting the electric power unit and the torch, are all designed to continuously withstand the thermal stress produced by electric current flow in the machine operating at maximum power.

In the case in question, torches, guns, electric cables, and electric power converter components are designed to prevent overheating resulting in operating temperatures endangering the operator and/or the structural integrity of the machine.

Though excellent in terms of operation, welding machines of the above type have never been particularly versatile when the work calls for replacing the torch or gun and/or the electric power unit connecting cable. In which case, the original torch or gun must be replaced with a similar product capable of safely withstanding the maximum electric current output of the machine.

Given the difficulty, however, frequently encountered in procuring commercial torches, guns and/or connecting cables capable of withstanding the same current rating, most users, to be on the safe side, opt for commercial torches, guns and connecting cables with a higher current rating than specified for the machine.

Needless to say, component weight, size and cost increase in proportion to the current rating, so that oversizing the torches, guns and cables makes the machine harder to handle and greatly increases working cost.

SUMMARY OF THE INVENTION

It is an object of the present invention to provide an electric arc welding machine designed to eliminate the aforementioned drawbacks.

According to the present invention, there is provided an electric arc welding machine comprising a welding tool designed for manual manipulation by the user for manual welding, and an electric power unit connected electrically to said welding tool by a connecting cable to supply the welding tool with electric operating power; said electric power unit comprising an electric power converter for powering the welding tool over said connecting cable, an electronic central control unit for controlling the electric power converter, and a control panel by which to manually set, in the electronic central control unit, the desired operating mode from those available; said welding machine being characterized by also comprising manually-operated first selecting means by which to manually set in the electronic central control unit the operating specifications of said connecting cable and/or said welding tool connected to the electric power unit; and in that said electronic central control unit real-time controls the electric power supplied to the welding tool over the connecting cable, so as to conform with said operating specifications.

BRIEF DESCRIPTION OF THE DRAWING

The present invention will be described with reference to the accompanying drawing, which shows a view in perspective, with parts removed fro clarity, of an electric arc welding machine in accordance with the teachings of the present invention.

DETAILED DESCRIPTION OF THE INVENTION

Number 1 in the accompanying drawing indicates as a whole a compact, portable electric arc welding machine, preferably, though not necessarily, designed for MIG (Metal Inert Gas), MAG (Metal Active Gas), TIG (Tungsten Inert Gas), STICK or MMA (Metal Manual Arc) welding or any combination of these.

Welding machine 1 substantially comprises a torch or welding gun 2 designed for manual manipulation by the operator for manual welding; and an electric power unit 3 connected electrically to torch or gun 2 by a connecting cable 4 to supply the torch or gun with electric power by which to perform the above welding processes, with real-time control of voltage and current supply. In the example shown, welding machine 1 also comprises a ground cable 5 fitted on the end with a clip 6 for closing the electric welding circuit.

Torch or gun 2, connecting cable 4, and ground cable 5 with attached clip 6 are all commonly known devices and therefore not described in detail.

With reference to the accompanying drawing, electric power unit 3, on the other hand, substantially comprises a supporting carriage 7 wheel-mounted to rest on the floor and enclosed by cover panels not shown; and an electric power converter 8, which draws electrical energy from the mains (not shown) and converts it to electrical energy suitable for supply over connecting cable 4 to torch or gun 2, i.e. electrical energy with voltage and current values varying in real time as a function of demand by the welding process being performed.

Electric power converter 8 is housed on supporting carriage 7, and electric power unit 3 also comprises a wire-feed device 9 for supplying torch 2, along connecting cable 4, with a metal wire for MIG or MAG welding; and a cooling unit 10 for circulating coolant through the whole of connecting cable 4 and torch 2 to remove surplus heat produced in the cable and torch and so keep torch 2 and connecting cable 4 below a predetermined maximum temperature.

Wire-feed device 9 and cooling unit 10 are commonly known devices and therefore not described in detail, except to state that, in the example shown, both are housed on supporting carriage 7.

With reference to the accompanying drawing, electric power unit 3 also comprises an electronic central control unit 11 for controlling electric power converter 8 according to the specifications of the selected welding process; and a manually-operated control panel 12 by which to manually set, in electronic central control unit 11, the desired welding mode from those available, together with any operating options associated with the various available welding processes.

In the example shown, control panel 12 is located on the front of electric power unit 3, just above the connectors for connecting connecting cable 4 and ground cable 5 to electric power unit 3, or rather to electric power converter 8, while electronic central control unit 11 is located on supporting carriage 7, directly on top of electric power converter 8.

With reference to the accompanying drawing, control panel 12 comprises a number of hand-operated selection knobs and/or keys 12a by which to manually set, in electronic central control unit 11, the desired welding process from those available; and a number of display devices 12b for displaying information relating to the operating state of the machine, such as the selected welding process (MIG, MAG, TIG, STICK) and/or the welding voltage/current supplied to torch or gun 2 over connecting cable 4.

Control panel 12 also comprises a number of hand-operated selection keys and/or similar selection means 12c by which to manually set in electronic central control unit 11 the operating specifications of connecting cable 4 and/or torch or gun 2 currently connected to electric power unit 3, thus assigning to electronic central control unit 11 the job of real-time controlling electric power supply to torch or gun 2 over connecting cable 4, to avoid exceeding the operating specifications of the currently connected connecting cable 4 and/or torch or gun 2.

More specifically, electronic central control unit 11 real-time controls electric power converter 8 so that voltage and electric current supply to torch or gun 2 over connecting cable 4 match instant by instant the time patterns of the selected welding process, while at the same time, however, keeping electric current flow within the maximum values of the operating specifications of the currently connected connecting cable 4 and/or torch or gun 2.

In the example shown, electronic central control unit 11 comprises a memory module 13—preferably, though not necessarily, a non-volatile type that can be updated on command—in which the operating specifications of various commercial connecting cable 4, torch 2 and/or gun 2 models are stored, together with the corresponding maximum permissible electric current flow values (i.e. maximum mean electric current value, maximum effective electric current value, and/or maximum instantaneous electric current flow value); and a control module 14 for controlling electric power converter 8 as a function of the currently selected welding process.

Selection means 12c on control panel 12 allow the user to manually set in electronic central control unit 11 the operating specifications corresponding to any one of the various connecting cable 4, torch 2 and/or gun 2 models stored in memory module 13, while control module 14 controls electric power converter 8 as a function of both the currently selected welding process, and the maximum electric current values in the operating specifications of the connecting cable 4, torch or gun 2 and/or ground cable 5 selected by the user from those stored in memory module 13.

In other words, control module 14 of electronic central control unit 11 real-time controls electric power converter 8 so that voltage and electric current supply to torch or gun 2 over connecting cable 4 match instant by instant the time patterns of the selected welding process, while at the same time, however, keeping mean electric current supply and/or effective electric current supply and/or instantaneous electric current supply within the maximum values of the connecting cable 4 and torch or gun 2 set by the user using selection means 12c on control panel 12.

In addition, it should be pointed out that, if the connecting cable 4 and/or torch or gun 2 connected to electric power unit 3 are not in the list of models whose operating specifications are stored in memory module 13, the operating specifications of the new connecting cable 4 and/or torch or gun 2 can be entered into memory module 13 of electronic central control unit 11 using selection means 12c, so that control module 14 of the central control unit can limit maximum electric current supply as a function of the newly entered operating specifications.

Operation of welding machine 1 as described and illustrated herein is easily deducible from the foregoing description with no further explanation required.

The advantages of welding machine 1 are obvious: by automatically limiting electric current supply as a function of the operating specifications of the connecting cable 4, torch or gun 2, and/or ground cable 5 actually installed, welding machine 1 may safely be fitted with any type of connecting cable 4 and/or torch or gun 2 without endangering the user or the structural integrity of the machine.

Compared with known welding machines, welding machine 1 is also more versatile, by also permitting temporary use of torches or guns 2 specially designed to operate in tight spaces.

Torches or guns of this sort, in fact, are extremely small and withstand much lower electric currents than conventional torches or guns 2, so that metalworking shops must also be equipped with low-power welding machines specially designed for such torches or guns.

Clearly, changes may be made to electric arc welding machine 1 as described and illustrated herein without, however, departing from the scope of the present invention.

In particular, in a variation not shown, electronic central control unit 11 may also be designed to control minimum electric current supply, to prevent it from falling below a predetermined threshold value, which may be a function of both the selected welding process and the type of torch or gun 2 fitted to the machine.

The invention claimed is:

1. An electric arc welding machine, comprising:
  a manual welding tool;
  an electric power unit;
  a connecting cable electrically connecting the manual welding tool to the electric power unit; and
  a ground cable connected to the electric power unit for closing an electric welding circuit;
  wherein said electric power unit includes:
  an electric power converter for supplying power to the manual welding tool via a the connecting cable;
  an electronic central control unit electrically connected to the electric power converter, and configured to control the electric power converter, wherein the electronic central control unit includes a memory module for storing therein operating specifications of a plurality of connecting cables connectable between the electric power unit and the manual welding tool; and
  a control panel electrically connected to the electronic central control unit and configured for
   (i) manually selecting, from the operating specifications stored in the memory module, an operating specification matching the connecting cable that electrically connects the manual welding tool to the electric power unit;
   (ii) manually entering, in the memory module, the operating specification of the connecting cable that electrically connects the manual welding tool to the electric power unit when none of the operating specifications stored in the memory module match the connecting cable that electrically connects the manual welding tool to the electric power unit; and
   (iii) manually setting, in the electronic central control unit, a selected operating mode of the welding machine;
  wherein
  the memory module is further arranged for storing therein operating specifications of a plurality of manual welding tools; and
  the control panel is further configured for
   (iv) manually selecting, from the operating specifications stored in the memory module, an operating specification matching the manual welding tool that is electrically connected to the electric power unit via the connecting cable;
   (v) manually entering, in the memory module, the operating specification of the manual welding tool that is electrically connected to the electric power unit via the connecting cable when none of the operating specifications stored in the memory module match the manual welding tool that is electrically connected to the electric power unit via the connecting cable; and
  the memory module is further arranged for storing therein operating specifications of a plurality of ground cables; and
  the control panel is further configured for
   (vi) manually selecting, from the operating specifications stored in the memory module, an operating specification matching the ground cable that is electrically connected to the electric power unit;
   (vii) manually entering, in the memory module, the operating specification of the ground cable that is electrically connected to the electric power unit when none of the operating specifications stored in the memory module match the ground cable that is electrically connected to the electric power unit; and
  wherein said electronic central control unit is configured to control, in real-time, the power supplied by the electric power converter to the manual welding tool over the connecting cable in accordance with the selected operating mode and in conformance with the operating specification of the manual welding tool, the operating specification of the connecting cable, and the operating specification of the ground cable.

2. The electric arc welding machine as claimed in claim 1, wherein said electronic central control unit is configured to control said electric power converter so that voltage and electric current supplied to the manual welding tool over the connecting cable match time patterns of the selected operating mode, while at the same time, keeping the supplied electric current at or below maximum electric current flow values in the operating specification of the manual welding tool, the operating specification of the connecting cable, and the operating specification of the ground cable.

3. The electric arc welding machine as claimed in claim 2, wherein said electronic central control unit further comprises a control module for controlling said electric power converter as a function of both the selected operating mode and the maximum electric current flow values in the operating specification of the manual welding tool, the operating specification of the connecting cable, and the operating specification of the ground cable.

* * * * *